US010236529B2

(12) United States Patent
Naito

(10) Patent No.: US 10,236,529 B2
(45) Date of Patent: Mar. 19, 2019

(54) FUEL CELL STACK

(71) Applicant: Honda Motor Co., Ltd., Tokyo (JP)

(72) Inventor: Hideharu Naito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 15/427,056

(22) Filed: Feb. 8, 2017

(65) Prior Publication Data

US 2017/0237107 A1    Aug. 17, 2017

(30) Foreign Application Priority Data

Feb. 16, 2016   (JP) .................................. 2016-027328

(51) Int. Cl.
H01M 8/00       (2016.01)
H01M 8/248      (2016.01)
H01M 8/2404     (2016.01)
H01M 8/241      (2016.01)
H01M 8/2483     (2016.01)

(52) U.S. Cl.
CPC ........... *H01M 8/248* (2013.01); *H01M 8/241* (2013.01); *H01M 8/2404* (2016.02); *H01M 8/2483* (2016.02)

(58) Field of Classification Search
CPC .... H01M 8/248; H01M 8/2404; H01M 8/241; H01M 8/2483
See application file for complete search history.

(56) References Cited

U.S. PATENT DOCUMENTS 3,128,813 A * 4/1964 Davis .................... F16B 5/0208
                                                       411/180
2002/0058177 A1* 5/2002 Nishiyama .......... H01M 8/0247
                                                       429/434

FOREIGN PATENT DOCUMENTS

JP    2013-179032    9/2013
JP    2014-216269    11/2014

* cited by examiner

Primary Examiner — Cynthia H Kelly
Assistant Examiner — Monique M Wills
(74) Attorney, Agent, or Firm — JCIPRNET

(57) ABSTRACT

Provided is a fuel cell stack capable of suppressing damage to a seal member and suppressing leakage of a reaction gas to the outside of a casing or entry of water from the outside of the casing for a long period of time. The fuel cell stack includes a pair of end plates and holds a laminate from two sides in a direction, a casing which houses the laminate and has connection bars extended between the pair of end plates, a fastening member inserted into an end plate side mounting hole and a connection bar side mounting hole, and chamfered parts formed in an end plate side small diameter part of the end plate side mounting hole. A chamfer angle between an inner surface of the outer chamfered part and the direction is larger than a chamfer angle between an inner surface of the inner chamfered part and the direction.

4 Claims, 8 Drawing Sheets

FUEL CELL STACK

CROSS-REFERENCE TO RELATED APPLICATION

This application claims the priority benefit of Japan application serial no. 2016-027328, filed on Feb. 16, 2016. The entirety of the above-mentioned patent application is hereby incorporated by reference herein and made a part of this specification.

BACKGROUND OF THE INVENTION

Field of the Invention

The invention relates to a fuel cell stack.

Description of Related Art

A fuel cell stack mounted on a vehicle or the like includes a fuel cell laminate (simply referred to as "laminate" hereinafter) and a casing that houses the laminate (refer to Patent Literature 1 below, for example). The laminate is formed by laminating a plurality of unit cells. The unit cell includes a membrane electrode assembly (MEA) and separators that hold the membrane electrode assembly, wherein the membrane electrode assembly is formed by disposing an anode electrode and a cathode electrode to hold a solid polymer electrolyte membrane from two sides.

The casing includes a pair of end plates that holds the laminate from two sides in the lamination direction, connection bars extended between the pair of end plates, and side panels that surround the laminate in a direction orthogonal to the lamination direction. In a state where the end plates and the connection bars abut against each other in the lamination direction of the laminate, the end plates and the connection bars are fastened by fastening members inserted into end plate side mounting holes and connection bar side mounting holes. For example, the Patent Literature 2 below has disclosed a configuration in which a cylindrical knock is disposed in the end plate side mounting hole and the connection bar side mounting hole. The cylindrical knock is disposed across the end plate side mounting hole and the connection bar side mounting hole and is externally fitted to the fastening member.

In the above-described fuel cell stack, hydrogen gas is supplied to the anode electrode as a fuel gas while air is supplied to the cathode electrode as an oxidant gas. Thus, hydrogen ions generated by the catalytic reaction at the anode electrode move through the solid polymer electrolyte membrane to the cathode electrode and electrochemically react with the oxygen in the air at the cathode electrode to generate power.

PRIOR ART LITERATURE

Patent Literature

Patent Literature 1: Japanese Patent Publication No. 2014-216269

Patent Literature 2: Japanese Patent Publication No. 2013-179032

SUMMARY OF THE INVENTION

Problem to be Solved

However, for the conventional fuel cell stack, the reaction gas (the fuel gas or the oxidant gas) that flows in the laminate may sometimes leak outside the laminate through the unit cells or gaps among various seal members. In such a case, the reaction gas that leaks outside the laminate may leak to the outside of the casing, for example, through the end plate side mounting hole and the connection bar side mounting hole. In particular, the hydrogen gas that is used as the fuel gas comprises small molecules and therefore may make the aforementioned problem worse. Besides, if water that exists outside the casing enters the end plate side mounting hole or the connection bar side mounting hole, it may result in corrosion of the cylindrical knock, etc.

Regarding this, it is considered to interpose a seal member between the outer peripheral surface of the cylindrical knock and the inner peripheral surface of the mounting hole to be in close contact with the outer peripheral surface of the cylindrical knock and the inner peripheral surface of the mounting hole. During assembly or maintenance of the fuel cell stack, the seal member is attached to or detached from the mounting hole together with the cylindrical knock while being externally fitted to the cylindrical knock, for example. However, if the seal member comes into contact with the corner, which is for example formed by the inner surface of the end plate side mounting hole and the end surface of the end plate that faces the lamination direction, when being attached to or detached from the mounting hole, the seal member may be damaged.

In view of the above, the invention provides a fuel cell stack that is capable of suppressing damage to the seal member and suppressing leakage of the reaction gas to the outside of the casing or entry of water from the outside of the casing for a long period of time.

Solution to the Problem

According to an embodiment of the invention, the fuel cell stack includes a fuel cell laminate (the laminate 3 in the embodiment, for example) in which a plurality of fuel battery cells (the unit cells 2 in the embodiment, for example) are laminated in a first direction; a casing (the casing 4 in the embodiment, for example) which houses the fuel cell laminate and includes a pair of end plates (the first end plate 81 and the second end plate 82 in the embodiment, for example) that holds the fuel cell laminate from two sides in the first direction and a connection member (the first connection bar 83 and the second connection bar 84 in the embodiment, for example) that is extended between the pair of end plates; a fastening member (the fastening member 100 in the embodiment, for example) which fastens the end plates and the connection member in the first direction; a cylindrical knock (the cylindrical knock 110 in the embodiment, for example) which is disposed to extend in an end plate side mounting hole (the end plate side mounting hole 101 in the embodiment, for example) of the end plate and a connection member side mounting hole (the connection bar side mounting hole 102 in the embodiment, for example) of the connection member, through which the fastening member is inserted, in the first direction and is externally fitted to the fastening member in the end plate side mounting hole and the connection member side mounting hole; a first seal member (the outer seal member 122 in the embodiment, for example) which is externally fitted to the cylindrical knock in the end plate side mounting hole and is in close contact with an inner peripheral surface of the end plate side mounting hole and the cylindrical knock; a second seal member (the inner seal member 123 in the embodiment, for example) which is externally fitted to the cylindrical knock in the connection member side mounting hole and is in close contact with an inner peripheral surface of the connection member side mounting hole and the cylindrical knock; an outer chamfered part (the outer chamfered part 131 in the embodiment, for example) formed on an outer opening edge, which is open on a side opposite to the connection member side mounting hole in the first direction, in the end plate side mounting hole; and an inner chamfered part (the inner chamfered part 132 in the embodiment, for example) formed on an inner opening edge, which is open to the connection member side mounting hole in the first direction, in the end plate side mounting hole. A chamfer angle between an inner surface of the outer chamfered part and the first direction is larger than a chamfer angle between an inner surface of the inner chamfered part and the first direction.

According to another embodiment of the invention, a maximum inner diameter (the maximum inner diameter ΦA in the embodiment, for example) of the outer chamfered part may be larger than an outer shape (the outer diameter ΦB in the embodiment, for example) of the first seal member and the second seal member in a front view as viewed from the first direction.

According to yet another embodiment of the invention, a curved surface part (the curved surface part 150 in the embodiment, for example) that is convex toward an inside of the end plate side mounting hole is formed at a boundary portion between the inner surface of the outer chamfered part and an outer end surface (the end plate side boundary surface 101c in the embodiment, for example), which is continuous with the inner surface of the outer chamfered part and faces outward in the first direction, in the end plate.

Effects of the Invention

According to an embodiment of the invention, the reaction gas that leaks into the casing from the laminate can be prevented from being released to the outside of the fuel cell stack through the respective mounting holes. Particularly, because the first seal member is in close contact with the inner peripheral surface of the end plate side mounting hole and the cylindrical knock, the reaction gas that has entered the mounting hole can be suppressed from leaking to the outside of the fuel cell stack via the outer peripheral side of the cylindrical knock. Moreover, entry of water that exists outside the casing into the casing through the end plate side mounting hole can be blocked by the first seal member. In this case, it is possible to block water at the end plate side of the boundary portion between the end plate and the connection member. Thus, corrosion of the portion of the cylindrical knock, which is particularly subject to the shearing force, can be suppressed. Further, because the second seal member is in close contact with the inner peripheral surface of the connection member side mounting hole and the cylindrical knock, it is possible to suppress the reaction gas that has entered the mounting hole from going around the laminate side of the cylindrical knock in the first direction to enter the inner peripheral side of the cylindrical knock.

Here, by forming the chamfered parts on the outer opening edge and the inner opening edge of the end plate side mounting hole, the boundary portions (outer boundary portion and inner boundary portion) between the inner surface of the end plate side mounting hole and the end surface of the end plate, which faces the first direction, are continuous smoothly. Thereby, when the seal member is attached to or detached from the mounting hole during assembly of maintenance of the fuel cell stack, contact between the seal member and the aforementioned boundary portions can be suppressed. As a result, damage to the seal member can be suppressed, and leakage of the reaction gas to the outside of the casing or entry of water from the outside of the casing, as described above, can be suppressed for a long period of time. Particularly, the chamfer angle of the outer chamfered part is larger than the chamfer angle of the inner chamfered part. Therefore, during installation of the seal member, contact between the seal member and the aforementioned outer boundary portion in the end plate can be suppressed with certainty. Furthermore, when the second seal member passes through the inner opening edge of the end plate side mounting hole in the first direction, the second seal member is already compressed and deformed. Moreover, if a part of the cylindrical knock is located in the connection member side mounting hole when the second seal member passes through the inner opening edge of the end plate side mounting hole in the first direction, positional displacement between the end plate and the connection member is unlikely to occur. Therefore, even if the chamfer angle of the inner chamfered part is set smaller than the chamfer angle of the outer chamfered part, contact between the second seal member and the aforementioned inner boundary portion can still be suppressed. By setting the chamfer angle of the inner chamfered part smaller than the chamfer angle of the outer chamfered part, a contact area (seat surface area) between the inner end surface of the end plate in the first direction and the outer end surface of the connection member in the first direction can be secured. As a result, the fastening force between the end plate and the connection member can be secured.

According to another embodiment of the invention, the maximum inner diameter of the outer chamfered part is larger than the outer shape of the seal member in the front view as viewed from the first direction, and thus contact between the aforementioned each boundary portion and the seal member can be suppressed with certainty.

According to another embodiment of the invention, damage to the seal member can be suppressed even if the seal member comes into contact with the outer opening edge of the end plate side mounting hole.

DESCRIPTION OF THE EMBODIMENTS

Hereinafter, embodiments of the invention are described with reference to the figures.

First Embodiment

[Fuel Cell Stack]

Figure 1:
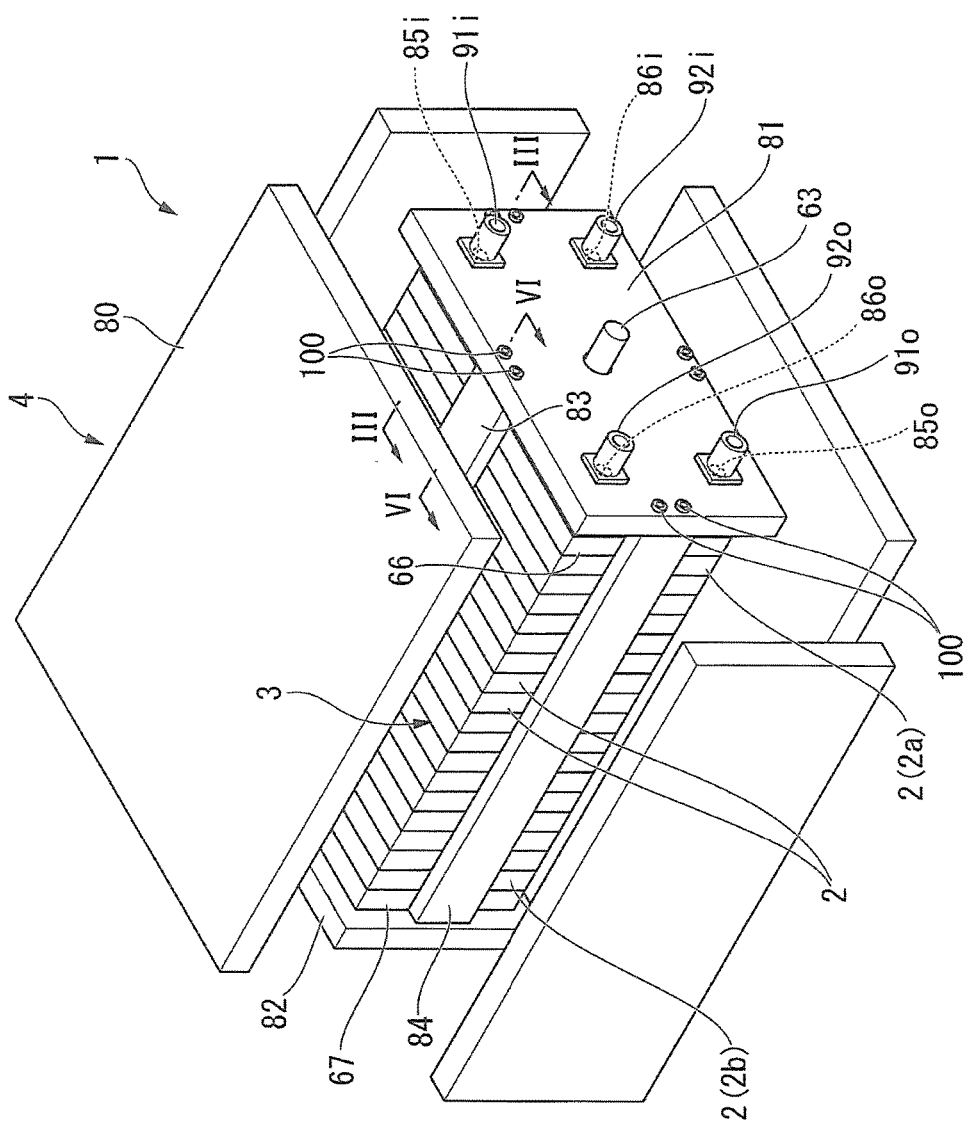
FIG. 1 is an exploded perspective view of the fuel cell stack of the first embodiment as viewed from the side of the first end plate.

FIG. 1 is an exploded perspective view of a fuel cell stack 1 of this embodiment as viewed from the side of a first end plate 81. As shown in FIG. 1, the fuel cell stack 1 of this embodiment is mounted under a floor or in the motor room defined in a front part of a vehicle (not shown). The fuel cell stack 1 is used to supply power to a driving motor, for example. The fuel cell stack 1 of this embodiment is mounted on the vehicle in a manner that a direction A (first direction) in the figure is a width direction of the vehicle, a direction B is a longitudinal direction of the vehicle, and a direction C is a vertical direction of the vehicle, for example.

The fuel cell stack 1 mainly includes a laminate (fuel cell laminate) 3 and a casing 4 that houses the laminate 3. The laminate 3 is formed by laminating a plurality of unit cells (fuel battery cells) 2 in the direction A. In the following description, in the aforementioned direction A, direction B, and direction C, a direction toward a central part of the laminate 3 may be referred to as an inner side while a direction away from the central part of the laminate 3 may be referred to as an outer side.

<Unit Cell>

Figure 2:
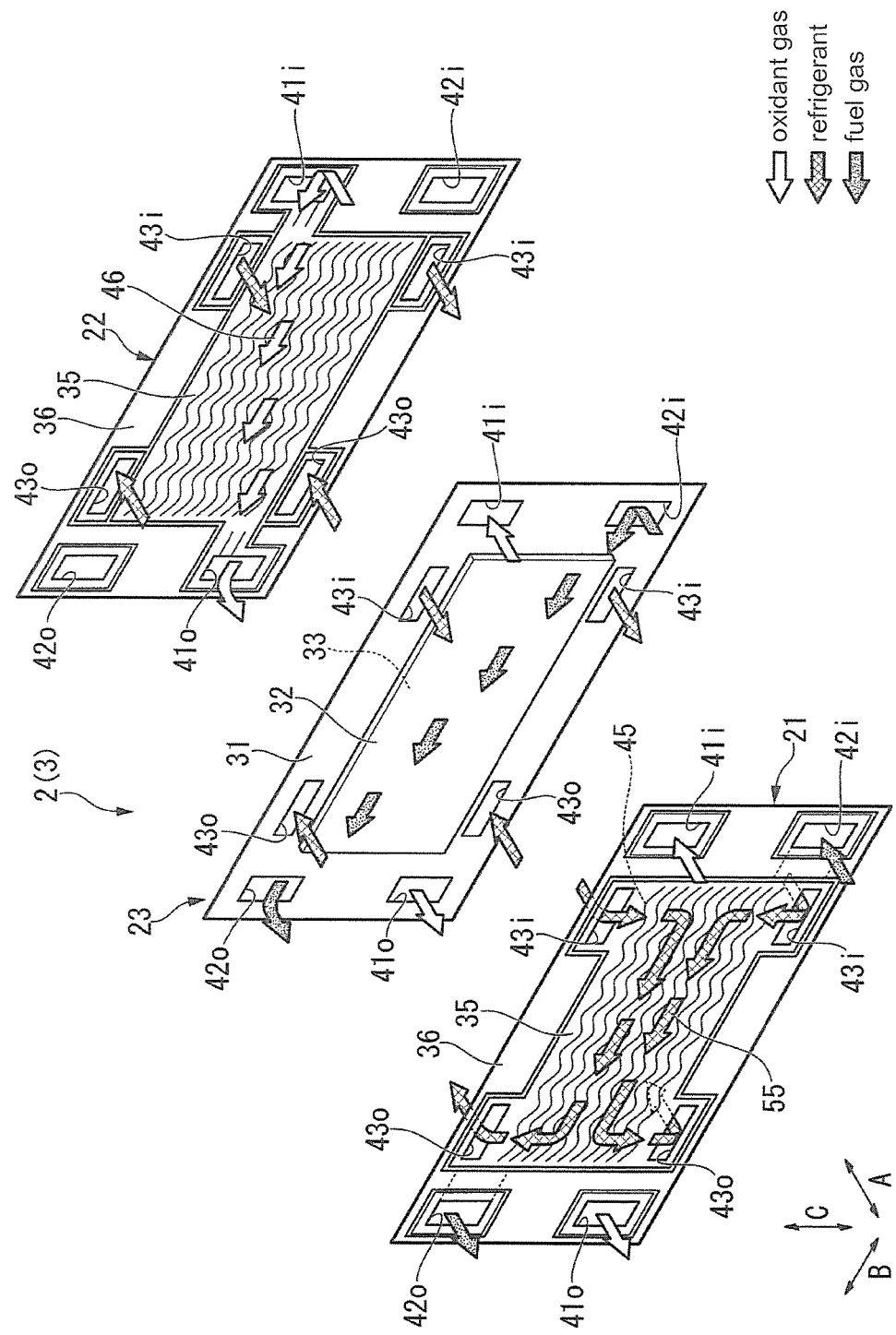
FIG. 2 is an exploded perspective view of the unit cell shown in FIG. 1.

FIG. 2 is an exploded perspective view of the unit cell 2. As shown in FIG. 2, the unit cell 2 includes a pair of separators 21 and 22 and a membrane electrode assembly 23 (simply referred to as "MEA 23" hereinafter) held between the separators 21 and 22, for example. The MEA 23 includes a solid polymer electrolyte membrane 31, an anode electrode 32, and a cathode electrode 33. The anode electrode 32 and the cathode electrode 33 hold the solid polymer electrolyte membrane 31 from two sides in the direction A. The anode electrode 32 and the cathode electrode 33 respectively include a gas diffusion layer and an electrode catalyst layer. The gas diffusion layer is composed of carbon paper, etc. The electrode catalyst layer is formed by uniformly applying porous carbon particles, which carry a platinum alloy on the surfaces thereof, to a surface of the gas diffusion layer. The solid polymer electrolyte membrane 31 is formed of a material of a perfluorosulfonic acid polymer impregnated with water, for example. An outer shape of the solid polymer electrolyte membrane 31 in the front view, as viewed from the direction A, is larger than the outer shapes of the anode electrode 32 and the cathode electrode 33. In the example of FIG. 2, the anode electrode 32 and the cathode electrode 33 overlap each other in the central part of the solid polymer electrolyte membrane 31. An outer peripheral part of the solid polymer electrolyte membrane 31 protrudes like a picture frame with respect to the anode electrode 32 and the cathode electrode 33.

The separators 21 and 22 of the unit cell 2 are a first separator 21 disposed on the MEA 23 on the side of the anode electrode 32 and a second separator 22 disposed on the MEA 23 on the side of the cathode electrode 33. In the following description, the same components of the separators 21 and 22 are denoted by the same reference numerals and are described together.

Each of the separators 21 and 22 includes a separator plate 35 and a covering member 36 that covers an outer peripheral part of the separator plate 35. The separator plate 35 is composed of a rectangular metal plate or carbon plate whose longitudinal direction is in the direction B. In the example of FIG. 2, the separator plate 35 is formed in the same outer shape as the solid polymer electrolyte membrane 31 in the front view. The separator plate 35 overlaps the MEA 23 when viewed in the direction A.

Figure 3:
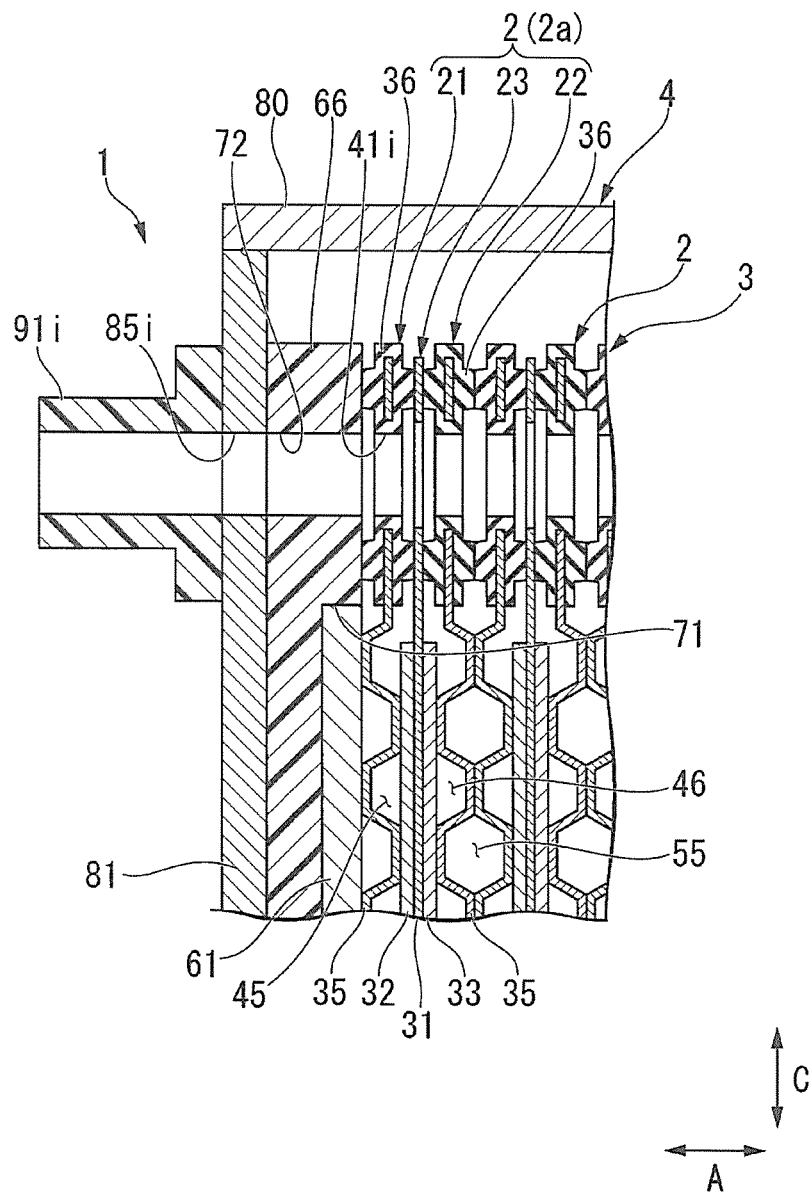
FIG. 3 is a cross-sectional view along the line III-III of FIG. 1.

FIG. 3 is a cross-sectional view along the line III-III of FIG. 1. As shown in FIG. 3, the covering member 36 is formed of an elastically deformable material, such as rubber. The covering member 36 is in close contact with the outer peripheral part of the solid polymer electrolyte membrane 31 in the direction A.

As shown in FIG. 2, inlet side gas communication holes (an oxidant gas inlet communication hole 41i and a fuel gas inlet communication hole 42i) and outlet side gas communication holes (an oxidant gas outlet communicating hole 41o and a fuel gas outlet communication hole 42o) are formed at corners of the unit cell 2. The communication holes 41i, 41o, 42i, and 42o penetrate the unit cell 2 in the direction A. In the example shown in FIG. 2, the oxidant gas inlet communication hole 41i for supplying an oxidant gas (air or the like, for example) is formed at the upper right corner of the unit cell 2. The fuel gas inlet communication hole 42i for supplying a fuel gas (hydrogen or the like, for example) is formed at the lower right corner of the unit cell 2. Besides, the oxidant gas outlet communication hole 41o for discharging a used oxidant gas is formed at the lower left corner of the unit cell 2. The fuel gas outlet communication hole 42o for discharging a used fuel gas is formed at the upper left corner of the unit cell 2.

In the unit cell 2, coolant inlet communication holes 43i are formed respectively in portions on the inner side in the direction B to correspond to the inlet communication holes 41i and 42i. In the unit cell 2, coolant outlet communication holes 43o are formed respectively in portions on the inner side in the direction B to correspond to the outlet communication holes 41o and 42o. The pair of coolant inlet communication holes 43i and the pair of coolant outlet communication holes 43o are respectively disposed at positions opposite to each other in the direction C with the anode electrode 32 and the cathode electrode 33 interposed therebetween.

A central part of each of the separators 21 and 22 (the separator plates 35) is formed into a concave and convex shape by press forming, etc. Surfaces of the separators 21 and 22, which face the MEA 23, are formed with gas passages 45 and 46 that are respectively located between the separators 21 and 22 and the MEA 23. Specifically, the fuel gas passage 45 is formed between the surface of the first separator 21, which faces the anode electrode 32, and the anode electrode 32 of the MEA 23. The fuel gas passage 45 communicates with the fuel gas inlet communication hole 42i and the fuel gas outlet communication hole 42o, respectively.

The oxidant gas passage 46 is formed between the surface of the second separator 22, which faces the cathode electrode 33, and the cathode electrode 33 of the MEA 23. The oxidant gas passage 46 communicates with the oxidant gas inlet communication hole 41i and the oxidiant gas outlet communication hole 41o, respectively.

As shown in FIG. 3, the laminate 3 is formed by laminating the unit cells 2 in the direction A in a state where the first separator 21 of one unit cell 2 and the second separator 22 of another unit cell 2 adjacent to the one unit cell 2 overlap each other. Then, a coolant passage 55 is formed between the first separator 21 of the one unit cell 2 and the second separator 22 of the another unit cell 2. As shown in FIG. 2, the coolant passage 55 communicates with the coolant inlet communication hole 43i and the coolant outlet communication hole 43o, respectively. It is preferable to use pure water, ethylene glycol, or the like, for example, as the coolant that flows through the coolant passage 55.

However, the laminated structure of the unit cell 2 is not limited to the configuration described above. For example, the unit cell may be composed of three separators and two MEAs respectively held between the separators. In addition, the design of layout of the communication holes may also be modified as appropriate.

Figure 4:
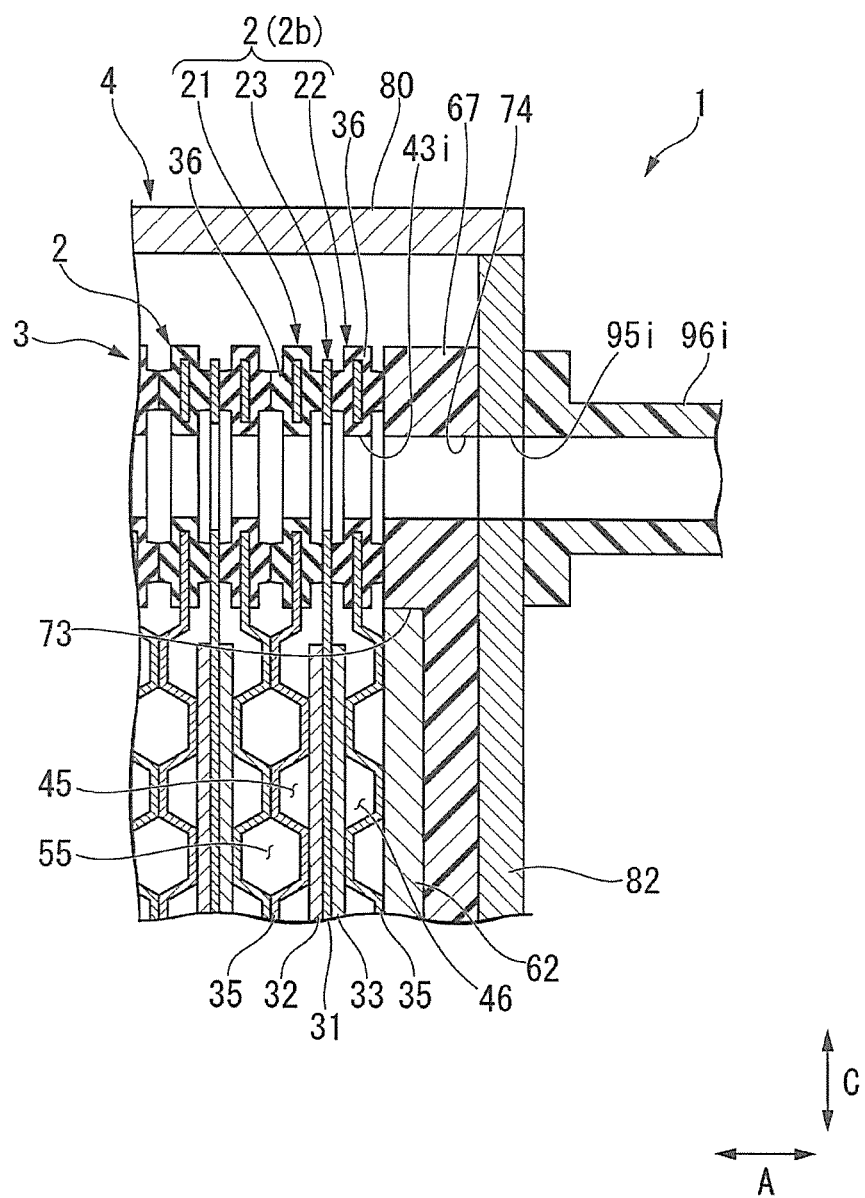
FIG. 4 is a cross-sectional view along the line IV-IV of FIG. 5.
Figure 5:
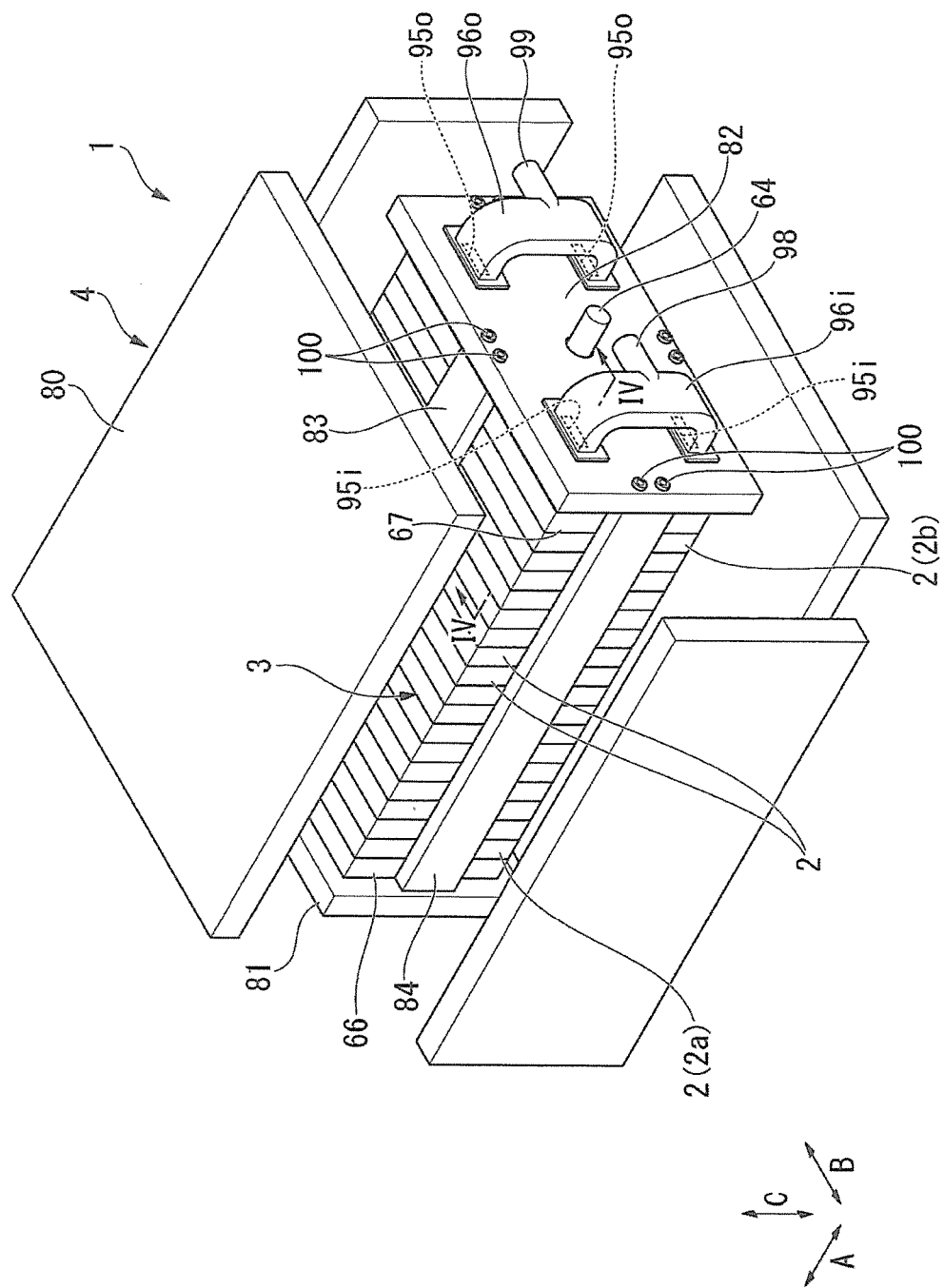
FIG. 5 is an exploded perspective view of the fuel cell stack of the first embodiment as viewed from the side of the second end plate.

FIG. 4 is a cross-sectional view along the line IV-IV of FIG. 5. As shown in FIG. 3 and FIG. 4, terminal plates (a first terminal plate 61 and a second terminal plate 62) are respectively disposed on two sides in the direction A with respect to the laminate 3. An outer shape of each of the terminal plates 61 and 62 is smaller than the outer shapes of the separators 21 and 22 in the front view. As shown in FIG. 3, the first terminal plate 61 conducts with the anode electrode 32 of the unit cell (referred to as a first end cell 2a hereinafter) located on one side of the laminate 3 (the unit cells 2) in the direction A via the first separator 21. An output terminal 63 (refer to FIG. 1) that protrudes toward the outer side in the direction A is formed on the first terminal plate 61.

A first insulator 66 is disposed on the outer side in the direction A with respect to the first terminal plate 61. An outer shape of the first insulator 66 is larger than the outer shape of the first terminal plate 61 in the front view. Moreover, the first insulator 66 is thicker than the first terminal plate 61 in the direction A.

A housing part 71 that is recessed toward the outer side in the direction A is formed in a central part of the first insulator 66. The aforementioned first terminal plate 61 is housed in the housing part 71. An outer peripheral part (the part located on the outer side of the housing part 71) of the first insulator 66 is in close contact with the first separator 21 (the covering member 36) of the first end cell 2a from the outer side in the direction A. An oxidant gas inlet connection hole 72 and a fuel gas inlet connection hole (not shown), which respectively communicate with the aforementioned gas inlet communication holes 41i and 42i, are formed in the outer peripheral part of the first insulator 66. Moreover, an oxidant gas outlet connection hole and a fuel gas outlet connection hole (not shown), which respectively communicate with the aforementioned gas outlet communication holes 41o and 42o, are formed in the outer peripheral part of the first insulator 66.

As shown in FIG. 4, the aforementioned second terminal plate 62 conducts with the cathode electrode 33 of the unit cell (referred to as a second end cell 2b hereinafter) located on the other side of the unit cells 2 in the direction A via the second separator 22. An output terminal 64 (refer to FIG. 5) that protrudes toward the outer side in the direction A is formed on the second terminal plate 62.

The second insulator 67 is disposed on the outer side in the direction A with respect to the second terminal plate 62. An outer shape of the second insulator 67 is larger than the outer shape of the second terminal plate 62 in the front view. Moreover, the second insulator 67 is thicker than the second terminal plate 62 in the direction A.

A housing part 73 that is recessed toward the outer side in the direction A is formed in a central part of the second insulator 67. The aforementioned second terminal plate 62 is housed in the housing part 73. An outer peripheral part (the part located on the outer side of the housing part 73) of the second insulator 67 is in close contact with the second separator 22 (the covering member 36) of the second end cell 2b from the outer side in the direction A. In addition, a coolant inlet connection hole 74 and a coolant outlet connection hole (not shown), which respectively communicate with the aforementioned coolant communication holes 43i and 43o, are formed in the outer peripheral part of the second insulator 67.

<Casing>

As shown in FIG. 1, the casing 4 is formed in a box shape that is slightly larger than the laminate 3. The casing 4 houses the laminate 3 therein. Specifically, the casing 4 includes a pair of end plates (a first end plate 81 and a second end plate 82), connection bars (a pair of first connection bars 83 and a pair of second connection bars 84 respectively connecting opposing sides of the end plates 81 and 82 with each other), and four side panels 80.

As shown in FIG. 3 and FIG. 4, the end plates 81 and 82 hold the laminate 3 from two sides in the direction A. Each of the end plates 81 and 82 is formed in a rectangular shape that has an outer shape larger than the outer shape of the unit cell 2 in the front view. As shown in FIG. 3, the first end plate 81 is disposed on one side in the direction A with respect to the laminate 3 in a state where the first terminal plate 61 and the first insulator 66 are held between the first end plate 81 and the laminate 3.

As shown in FIG. 1, gas inlet holes (an oxidant gas inlet hole 85i and a fuel gas inlet hole 86i) and gas outlet holes (an oxidant gas outlet hole 85o and a fuel gas outlet hole 86o) are formed at corners of the first end plate 81. The gas inlet holes 85i and 86i respectively communicate with the gas inlet communication holes 41i and 42i via the respective corresponding gas inlet connection holes (e.g., the oxidant gas inlet connection hole 72) of the first insulator 66. The gas outlet holes 85o and 86o respectively communicate with the gas outlet communication holes 41o and 42o via the respective corresponding gas outlet connection holes of the first insulator 66.

A plurality of gas manifolds 91i, 91o, 92i, and 92o are respectively connected to the corners of the first end plate 81. The gas manifolds 91i, 91o, 92i, and 92o are an oxidant gas inlet manifold 91i, an oxidant gas outlet manifold 91o, a fuel gas inlet manifold 92i, and a fuel gas outlet manifold 92o. The gas manifolds 91i, 91o, 92i, and 92o are respectively formed in a cylindrical shape that extends toward the outer side in the direction A from the first end plate 81.

The oxidant gas inlet manifold 91i communicates with the oxidant gas inlet communication hole 41i (refer to FIG. 3) of the laminate 3 via the oxidant gas inlet hole 85i and the oxidant gas inlet connection hole 72 (refer to FIG. 3). An oxidant gas inlet pipe (not shown) is connected to the oxidant gas inlet manifold 91i. The oxidant gas outlet manifold 91o communicates with the oxidant gas outlet communication hole 41o (refer to FIG. 2) of the laminate 3 via the oxidant gas outlet hole 85o of the first end plate 81 and the oxidant gas outlet connection hole of the first insulator 66. An oxidant gas outlet pipe (not shown) is connected to the oxidant gas outlet manifold 91o.

The fuel gas inlet manifold 92i communicates with the fuel gas inlet communication hole 42i (refer to FIG. 2) of the laminate 3 via the fuel gas inlet hole 86i of the first end plate 81 and the fuel gas inlet connection hole of the first insulator 66. A fuel gas inlet pipe (not shown) is connected to the fuel gas inlet manifold 92i. The fuel gas outlet manifold 92o communicates with the fuel gas outlet communication hole 42o (refer to FIG. 2) of the laminate 3 via the fuel gas outlet hole 86o of the first end plate 81 and the fuel gas outlet connection hole of the first insulator 66. A fuel gas outlet pipe (not shown) is connected to the fuel gas outlet manifold 92o.

As shown in FIG. 4, the second end plate 82 is disposed on the other side in the direction A with respect to the laminate 3 in a state where the second terminal plate 62 and the second insulator 67 are held between the second end plate 82 and the laminate 3.

FIG. 5 is an exploded perspective view of the fuel cell stack 1 as viewed from the side of the second end plate 82. As shown in FIG. 5, a pair of coolant inlet holes 95i and a pair of coolant outlet holes 95o are formed in the second end plate 82. The coolant inlet hole 95i communicates with the coolant inlet communication hole 43i via the corresponding coolant inlet connection hole 74 (refer to FIG. 4) of the second insulator 67. The coolant outlet hole 95o communicates with the coolant outlet communication hole 43o via the corresponding coolant outlet connection hole of the second insulator 67.

A plurality of coolant manifolds (a coolant inlet manifold 96i and a coolant outlet manifold 96o) are connected to the second end plate 82. The coolant inlet manifold 96i is formed in an arch shape in a side view as viewed in the direction B. Openings on two sides of the coolant inlet manifold 96i in the direction C respectively communicate with the corresponding ones of the coolant inlet holes 95i of the second end plate 82. Thereby, the coolant inlet manifold 96i communicates with the coolant inlet communication hole 43i of the laminate 3 via the coolant inlet hole 95i and the coolant inlet connection hole 74 (refer to FIG. 3). An inlet port 98 is disposed to protrude from a central part of the coolant inlet manifold 96i in the direction C. A coolant inlet pipe (not shown) is connected to the inlet port 98.

The coolant outlet manifold 96o is formed in an arch shape in the side view as viewed in the direction B. Openings on two sides of the coolant outlet manifold 96o in the direction C respectively communicate with the corresponding ones of the coolant outlet holes 95o of the second end plate 82. Thereby, the coolant outlet manifold 96o communicates with the coolant outlet communication hole 43o of the laminate 3 via the coolant outlet hole 95o and the coolant outlet connection hole (not shown) of the second insulator 67. An outlet port 99 is disposed to protrude from a central part of the coolant outlet manifold 96o in the direction C. A coolant outlet pipe (not shown) is connected to the outlet port 99.

As shown in FIG. 1, the first connection bar 83 and the second connection bar 84 are respectively formed in a plate shape that extends in the direction A. Nevertheless, a cross-sectional shape of each of the connection bars 83 and 84 may be modified as appropriate to a rectangular shape, a circular shape, or the like. The connection bars 83 and 84 are respectively fastened to the end plates 81 and 82 by a pair of fastening members 100 in a state where two end surfaces thereof in the direction A abut against inner end surfaces of the end plates 81 and 82 in the direction A respectively. Specifically, the first connection bar 83 connects the long side portions of the end plates 81 and 82 on two sides in the direction C with respect to the laminate 3. The second connection bar 84 connects the short side portions of the end plates 81 and 82 on two sides in the direction B with respect to the laminate 3. Three or more fastening members 100 may be provided for each of the connection bars 83 and 84.

The side panels 80 are disposed around the laminate 3 (on the outer side in the direction B and on the outer side in the direction C). The side panels 80 surround the laminate 3, the terminal plates 61 and 62 and the insulators 66 and 67, and the end plates 81 and 82 and the connection bars 83 and 84 from the outer side in the direction B and the outer side in the direction C.

Next, a fastening structure respectively between the end plates 81 and 82 and the connection bars 83 and 84 is described in detail. Nevertheless, the fastening structures between the end plates 81 and 82 and the connection bars 83 and 84 all have the same configuration. Therefore, the following mainly describes the fastening structure between the first end plate 81 and the first connection bar 83, and descriptions of the fastening structures for the other parts will be omitted.

Figure 6:
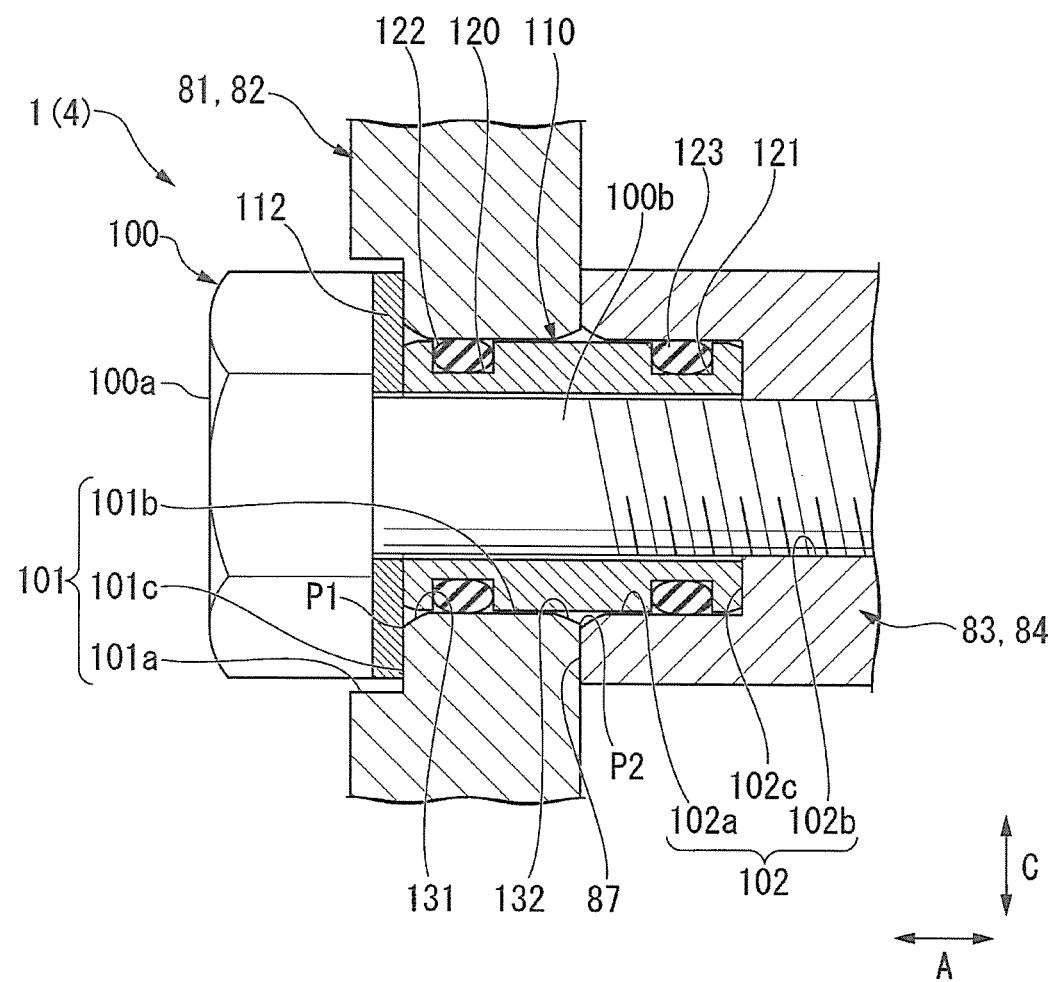
FIG. 6 is a cross-sectional view along the line VI-VI of FIG. 1.

FIG. 6 is a cross-sectional view along the line VI-VI of FIG. 1. As shown in FIG. 6, an end plate side mounting hole 101 is formed in a portion of the first end plate 81 that overlaps the first connection bar 83 in the direction A. The end plate side mounting hole 101 is a circular through hole that penetrates the first end plate 81 in the direction A. The end plate side mounting hole 101 has a multi-stepped shape with an inner diameter that decreases toward the inner side in the direction A. Specifically, the end plate side mounting hole 101 has an end plate side large diameter part 101a located on the outer side in the direction A, and an end plate side small diameter part 101b continuous to the inner side in the direction A with respect to the end plate side large diameter part 101a. The end plate side large diameter part 101a is shorter than the end plate side small diameter part 101b in the direction A. In this embodiment, two end plate side mounting holes 101 are formed at an interval in the direction B.

On an outer end surface 87 of the first connection bar 83 in the direction A, a connection bar side mounting hole 102 is formed in a portion that overlaps the end plate side mounting hole 101 in the direction A. The connection bar side mounting hole 102 extends in the direction A and is open on the outer end surface 87 of the first connection bar 83 in the direction A. An outer opening of the connection bar side mounting hole 102 in the direction A communicates with the end plate side mounting hole 101.

The connection bar side mounting hole 102 has a multi-stepped shape with an inner diameter that decreases toward the inner side in the direction A. Specifically, the connection bar side mounting hole 102 has a connection bar side large diameter part 102a located on the outer side in the direction A, and a connection bar side small diameter part 102b continuous to the inner side in the direction A with respect to the connection bar side large diameter part 102a. An inner diameter of the connection bar side large diameter part 102a is equal to an inner diameter of the end plate side small diameter part 101b. At least the connection bar side small diameter part 102b of the connection bar side mounting hole 102 is a female threaded hole.

A cylindrical knock 110 is inserted into each of the mounting holes 101 and 102. The cylindrical knock 110 positions the first end plate 81 and the first connection bar 83 as well as receives a shearing load applied between the first end plate 81 and the first connection bar 83. The cylindrical knock 110 is formed in a cylindrical shape that extends in the direction A.

The cylindrical knock 110 is disposed across the inner side of the end plate side small diameter part 101b and the inner side of the connection bar side large diameter part 102a. In this embodiment, the length of the cylindrical knock 110 in the direction A is equal to the total length of the end plate side small diameter part 101b and the connection bar side large diameter part 102a in the direction A. An inner end surface of the cylindrical knock 110 in the direction A abuts against a connection bar side boundary surface 102c between the connection bar side large diameter part 102a and the connection bar side small diameter part 102b from the outer side in the direction A. In addition, an outer end surface of the cylindrical knock 110 in the direction A is disposed at a position equivalent to an end plate side boundary surface 101c between the end plate side large diameter part 101a and the end plate side small diameter part 101b. Nevertheless, the length of the cylindrical knock 110 in the direction A may be modified as appropriate as long as it is equal to or less than the total length of the end plate side small diameter part 101b and the connection bar side large diameter part 102a in the direction A. Moreover, an outer diameter of the cylindrical knock 110 is smaller than the inner diameters of the end plate side small diameter part 101b and the connection bar side large diameter part 102a. Furthermore, an inner diameter of the cylindrical knock 110 is equal to or larger than an inner diameter of the connection bar side small diameter part 102b.

On an outer peripheral surface of the cylindrical knock 110, two housing grooves 120 and 121 are formed at an interval in the direction A. The housing grooves 120 and 121 are recessed radially inward on the cylindrical knock 110 and are formed over the entire circumference of the cylindrical knock 110. Among the housing grooves 120 and 121, the outer housing groove 120 located on the outer side in the direction A is formed in a portion of the cylindrical knock 110, which is located within the end plate side small diameter part 101b. Moreover, among the housing grooves 120 and 121, the inner housing groove 121 located on the inner side in the direction A is formed in a portion of the cylindrical knock 110, which is located within the connection bar side large diameter part 102a.

Seal members 122 and 123 are respectively housed in the housing grooves 120 and 121. The seal members 122 and 123 are respectively formed of an elastically deformable material (0 ring or the like, for example). The seal members 122 and 123 are respectively formed in an annular shape with the direction A as an axial direction. In the example as shown, a cross-sectional shape of the seal members 122 and 123 along the direction A is circular, but the invention is not limited thereto. The cross-sectional shape may also be rectangular or the like.

The seal members 122 and 123 are respectively housed in the housing grooves 120 and 121 in a state of being compressed and deformed (elastically deformed) in a radial direction (a direction orthogonal to the direction A). In this case, the outer seal member (first seal member) 122 located on the outer side in the direction A, among the seal members 122 and 123, is in close contact with the inner surface of the outer housing groove 120 and the inner peripheral surface of the end plate side small diameter part 101b when housed in the outer housing groove 120. In addition, the inner seal member (second seal member) 123 located on the inner side in the direction A, among the seal members 122 and 123, is in close contact with the inner surface of the inner housing groove 121 and the inner peripheral surface of the connection bar side large diameter part 102a when housed in the inner housing groove 121.

The fastening member 100 is screwed into the connection bar side mounting hole 102 through the end plate side mounting hole 101. Specifically, a head part 100a of the fastening member 100 abuts against the end plate side boundary surface 101c from the outer side in the direction A with a washer 112 interposed therebetween. In this case, the washer 112 and a portion of the head part 100a are housed in the end plate side large diameter part 101a. Thereby, a protrusion amount of the head part 100a from the first end plate 81 to the outer side in the direction A is suppressed. The fastening member 100 used in this embodiment is preferably a hexagon head bolt, for example. Nevertheless, the fastening member 100 is not necessarily a hexagon head bolt and may also be a hexagon socket head bolt or the like.

A shaft part 100b of the fastening member 100 has an outer diameter smaller than the inner diameter of the cylindrical knock 110. The shaft part 100b penetrates through the cylindrical knock 110 in each of the mounting holes 101 and 102. A tip end part of the shaft part 100b is screwed into the connection bar side small diameter part 102b.

Figure 7:
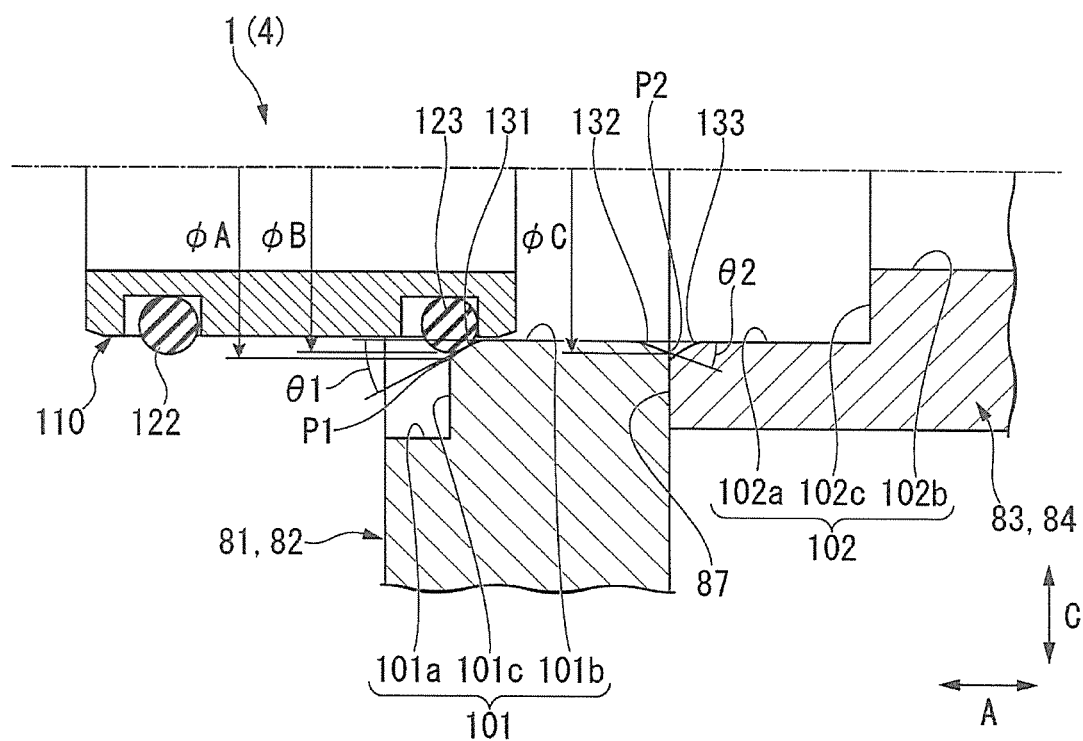
FIG. 7 is an enlarged cross-sectional view of the end plate and the connection bar including the respective mounting holes during attachment and detachment of the seal member.

FIG. 7 is an enlarged cross-sectional view of the end plate 81, 82 and the connection bar 83, 84 including the respective mounting holes 101 and 102 during attachment and detachment of the seal member 122, 123. Here, as shown in FIG. 7, chamfered parts 131 and 132 are formed on two end opening edges of the end plate side small diameter part 101b of the end plate side mounting hole 101 in the direction A. Each of the chamfered parts 131 and 132 is the so-called rounded chamfer. Specifically, each of the chamfered parts 131 and 132 is formed in a curved shape that is convex toward the inner side in the radial direction of the end plate side mounting hole 101 in a longitudinal cross-sectional view along the direction A.

Among the chamfered parts 131 and 132, the outer chamfered part 131 located on the outer side in the direction A is formed by cutting off a corner that is formed by the inner surface of the end plate side small diameter part 101b and the end plate side boundary surface 101c. At least a maximum inner diameter $\Phi A$ (the inner diameter on the outer end edge in the direction A) of the outer chamfered part 131 is larger than an outer diameter $\Phi B$ of each of the seal members 122 and 123 in a natural length (a state of not being compressed and deformed). Among the chamfered parts 131 and 132, the inner chamfered part 132 located on the inner side in the direction A is formed by cutting off a corner that is formed by the inner surface of the end plate side small diameter part 101b and the inner end surface of the first end plate 81 in the direction A. A maximum inner diameter $\Phi C$ (the inner diameter on the inner end edge in the direction A) of the inner chamfered part 132 may be smaller than the outer diameter $\Phi B$ of each of the seal members 122 and 123.

A chamfer angle $\theta 1$ of the outer chamfered part 131 is larger than a chamfer angle $\theta 2$ of the inner chamfered part 132. The "chamfer angle" of each of the chamfered parts 131 and 132 refers to an angle formed by a tangent line, which passes through the center of the inner surface of each of the chamfered parts 131 and 132 in the direction A, and the direction A. In this embodiment, the chamfer angles $\theta 1$ and $\theta 2$ of the chamfered parts 131 and 132 are respectively set as an acute angle (about 5° to 45°) with respect to each other.

In addition, in the connection bar side mounting hole 102, a connection bar side chamfered part 133 is formed on an outer opening edge of the connection bar side large diameter part 102a in the direction A. The connection bar side chamfered part 133 is the so-called rounded chamfer. Specifically, the connection bar side chamfered part 133 is formed in a curved shape that is convex toward the inner side in the radial direction of the connection bar side mounting hole 102 in the longitudinal cross-sectional view along the direction A. The connection bar side chamfered part 133 is formed by cutting off a corner that is formed by the inner surface of the connection bar side large diameter part 102a and the outer end surface 87 of the first connection bar 83 in the direction A. The connection bar side chamfered part 133 is formed in a shape that is equivalent to the aforementioned outer chamfered part 131. However, the shape of the connection bar side chamfered part 133 may be designed and modified as appropriate. For example, a chamfer angle of the connection bar side chamfered part 133 may be equal to the chamfer angle θ2 of the inner chamfered part 132.

In this embodiment as described above, the configuration includes the outer seal member 122 that is elastically deformed to be in close contact with the inner surface of the outer housing groove 120 and the inner peripheral surface of the end plate side small diameter part 101*b*. Therefore, as shown in FIG. 6, it is possible to suppress the reaction gas that has entered the mounting holes 101 and 102 from flowing toward the outer side in the direction A via the outer peripheral side of the cylindrical knock 110 with the outer seal member 122. Moreover, in this embodiment, the configuration includes the inner seal member 123 that is elastically deformed to be in close contact with the inner surface of the inner housing groove 121 and the inner peripheral surface of the connection bar side large diameter part 102*a*. Therefore, it is possible to suppress the reaction gas that has entered the mounting holes 101 and 102 from going around the inner side of the cylindrical knock 110 in the direction A to enter the inner peripheral side of the cylindrical knock 110 with the inner seal member 123. Thereby, the sealability between the mounting holes 101 and 102 and the fastening member 100 can be ensured, and release of the reaction gas from the mounting holes 101 and 102 to the outside of the casing 4 can be suppressed by the seal members 122 and 123.

Besides, entry of water that exists outside the casing 4 into the casing 4 through the end plate side mounting hole 101 can be blocked by the outer seal member 122. In this case, it is possible to block water outside the boundary portion between the first end plate 81 and the first connection bar 83 in the direction A. Thus, corrosion of the portion of the cylindrical knock 110, which is particularly subject to the shearing force, can be suppressed.

As shown in FIG. 7, in the configuration of this embodiment, the chamfered parts 131 and 132 are respectively formed on two end opening edges of the end plate side small diameter part 101*b* in the direction A. According to this configuration, the boundary portions (an outer boundary portion P1 and an inner boundary portion P2) respectively between the inner surface of the end plate side small diameter part 101*b* and the end plate side boundary surface 101*c* or the inner end surface of the first end plate 81 in the direction A continue smoothly. Thereby, when the seal members 122 and 123 are attached to or detached from the mounting holes 101 and 102 during assembly or maintenance of the fuel cell stack 1, contact between the seal members 122 and 123 and the aforementioned boundary portions P1 and P2 can be suppressed. As a result, damage to the seal members 122 and 123 can be suppressed, and leakage of the reaction gas to the outside of the casing 4 or entry of water from the outside of the casing 4, as described above, can be suppressed for a long period of time.

Particularly, in the configuration of this embodiment, the chamfer angle θ1 of the outer chamfered part 131 is set larger than the chamfer angle θ2 of the inner chamfered part 132. According to this configuration, during installation of the seal members 122 and 123, contact between the seal members 122 and 123 of the natural length and the aforementioned outer boundary portion P1 can be suppressed with certainty. Furthermore, when the inner seal member 123 passes through the inner opening edge of the end plate side small diameter part 101*b* in the direction A, the inner seal member 123 is already compressed and deformed. Moreover, if a part of the cylindrical knock 110 is located in the connection bar side mounting hole 102 when the inner seal member 123 passes through the inner opening edge of the end plate side small diameter part 101*b* in the direction A, positional displacement between the first end plate 81 and the first connection bar 83 is unlikely to occur. Therefore, even if the chamfer angle θ2 of the inner chamfered part 132 is set smaller than the chamfer angle θ1 of the outer chamfered part 131, contact between the inner seal member 123 and the aforementioned inner boundary portion P2 can still be suppressed. By setting the chamfer angle θ2 of the inner chamfered part 132 smaller than the chamfer angle θ1 of the outer chamfered part 131, a contact area (seat surface area) between the inner end surface of the first end plate 81 in the direction A and the outer end surface 87 of the first connection bar 83 in the direction A can be secured. As a result, the fastening force between the first end plate 81 and the first connection bar 83 can be secured.

Besides, in this embodiment, the maximum inner diameter ΦA of the outer chamfered part 131 is larger than the outer diameters of the seal members 122 and 123 in the natural length, and thus contact between the outer boundary portion P1 and the seal members 122 and 123 can be suppressed with certainty.

The fastening structures respectively for the first end plate 81 and the second connection bar 84, the second end plate 82 and the first connection bar 83, and the second end plate 82 and the second connection bar 84 also achieve the same function and effect as the aforementioned embodiment.

Second Embodiment

Figure 8:
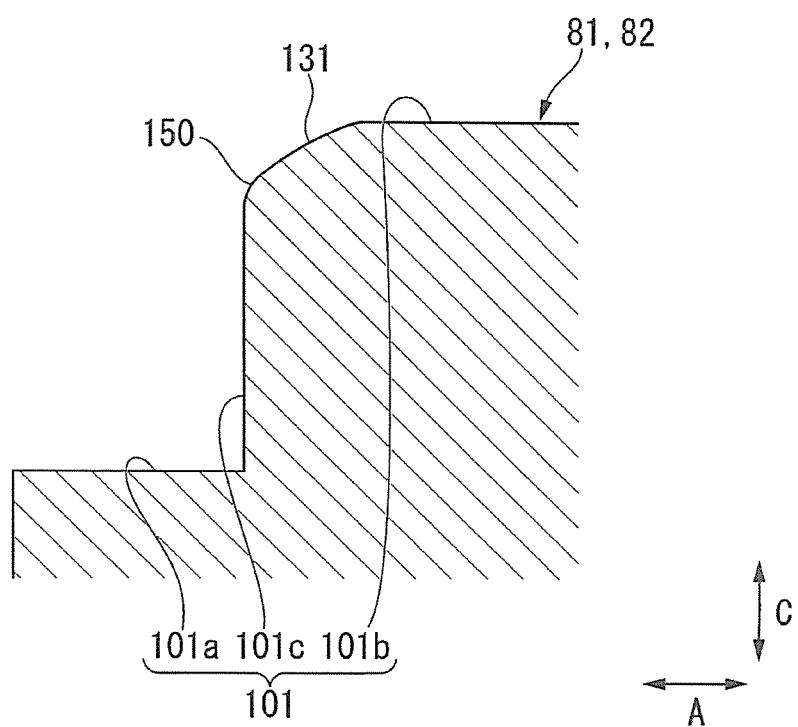
FIG. 8 is an enlarged cross-sectional view of the end plate including the end plate side mounting hole according to the second embodiment.

Next, the second embodiment of the invention is described. FIG. 8 is an enlarged cross-sectional view of the end plate 81, 82 including the end plate side mounting hole 101 according to the second embodiment. This embodiment is different from the aforementioned first embodiment in that a curved surface part 150 is formed at the boundary portion between the inner surface of the outer chamfered part 131 and the end plate side boundary surface 101*c*. In the following description, components the same as those of the first embodiment are denoted by the same reference numerals and descriptions thereof are omitted.

As shown in FIG. 8, the curved surface part 150 is formed in a curved shape that is convex toward the inside of the end plate side mounting hole 101 in the longitudinal cross-sectional view along the direction A. The curved surface part 150 is formed by cutting off a corner formed by the inner surface of the outer chamfered part 131 and the end plate side boundary surface 101*c*. The curved surface part 150 smoothly connects the inner surface of the outer chamfered part 131 and the end plate side boundary surface 101*c*. In this embodiment, a curvature radius of the curved surface part 150 is smaller than a curvature radius of the outer chamfered part 131.

In addition to achieving the same function and effect as the aforementioned embodiment, in this embodiment, damage to the seal members 122 and 123 can be suppressed even if the seal members 122 and 123 come into contact with the outer opening edge of the end plate side small diameter part 101*b* in the direction A. The curved surface part may also be formed at the boundary portion between the inner surface of the aforementioned connection bar side chamfered part 133 and the outer end surface 87 of the connection bar 83, 84 in the direction A.

However, the technical scope of the invention is not limited to the embodiments described above and includes various modifications that can be made to the aforementioned embodiments without departing from the spirit of the invention. That is to say, the configurations described in the above embodiments are merely examples and may be modified as appropriate. For example, although the above embodiment illustrates the case of using two seal members, three or more seal members may be used. Although the above embodiment illustrates that the head part 100a of the fastening member 100 is housed in the end plate side large diameter part 101a, the invention is not limited thereto.

Although the above embodiment illustrates that the mounting holes 101 and 102 respectively have a multi-stepped shape, the invention is not limited thereto, and the mounting holes 101 and 102 may be formed with a uniform inner diameter. In that case, the outer chamfered part is formed by cutting off the corner formed by the inner surface of the end plate side mounting hole and the outer end surface of the end plate 81, 82 in the direction A at the outer opening edge of the end plate side mounting hole in the direction A. Although the above embodiment illustrates that each of the chamfered parts 131 to 133 is a rounded chamfer, the invention is not limited thereto and they may be flattened. In addition, some of the chamfered parts 131 to 133 may be rounded while the others are flattened.

Besides, it is possible to appropriately replace components/elements of the aforementioned embodiments with other commonly known components/elements without departing from the spirit of the invention, and the aforementioned modified examples may be combined where appropriate.

What is claimed is:

1. A fuel cell stack, comprising:
a fuel cell laminate in which a plurality of fuel battery cells are laminated in a first direction;
a casing housing the fuel cell laminate, the casing comprising a pair of end plates that holds the fuel cell laminate from two sides in the first direction and a connection member that is extended between the pair of end plates;
a fastening member fastening the end plates and the connection member in the first direction;
a cylindrical knock arranged to extend in an end plate side mounting hole of the end plate and a connection member side mounting hole of the connection member, through which the fastening member is inserted, in the first direction and externally fitted to the fastening member in the end plate side mounting hole and the connection member side mounting hole;
a first seal member externally fitted to the cylindrical knock in the end plate side mounting hole and being in close contact with an inner peripheral surface of the end plate side mounting hole and the cylindrical knock;
a second seal member externally fitted to the cylindrical knock in the connection member side mounting hole and being in close contact with an inner peripheral surface of the connection member side mounting hole and the cylindrical knock;
an outer chamfered part formed on an outer opening edge, which is open on a side opposite to the connection member side mounting hole in the first direction, in the end plate side mounting hole; and
an inner chamfered part formed on an inner opening edge, which is open to the connection member side mounting hole in the first direction, in the end plate side mounting hole,
wherein a chamfer angle between an inner surface of the outer chamfered part and the first direction is larger than a chamfer angle between an inner surface of the inner chamfered part and the first direction.

2. The fuel cell stack according to claim 1, wherein a maximum inner diameter of the outer chamfered part is larger than an outer shape of the first seal member and the second seal member in a front view as viewed from the first direction.

3. The fuel cell stack according to claim 1, wherein a curved surface part that is convex toward an inside of the end plate side mounting hole is formed at a boundary portion between the inner surface of the outer chamfered part and an outer end surface, which is continuous with the inner surface of the outer chamfered part and faces outward in the first direction, in the end plate.

4. The fuel cell stack according to claim 2, wherein a curved surface part that is convex toward an inside of the end plate side mounting hole is formed at a boundary portion between the inner surface of the outer chamfered part and an outer end surface, which is continuous with the inner surface of the outer chamfered part and faces outward in the first direction, in the end plate.

* * * * *